United States Patent
DePompeo

(10) Patent No.: US 9,865,379 B2
(45) Date of Patent: Jan. 9, 2018

(54) THERMAL SLEEVE WITH SELF-ADJUSTING POSITIONING MEMBER, ASSEMBLY THEREWITH AND METHOD PROTECTING A TEMPERATURE SENSITIVE MEMBER THEREWITH

(71) Applicant: Federal-Mogul Powertrain, LLC, Southfield, MI (US)

(72) Inventor: Nicholas DePompeo, Avondale, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 15/227,585

(22) Filed: Aug. 3, 2016

(65) Prior Publication Data
US 2017/0040090 A1 Feb. 9, 2017

Related U.S. Application Data

(60) Provisional application No. 62/200,763, filed on Aug. 4, 2015.

(51) Int. Cl.
*H01B 17/58* (2006.01)
*H01B 7/00* (2006.01)
(Continued)

(52) U.S. Cl.
CPC ......... *H01B 17/58* (2013.01); *B60R 16/0215* (2013.01); *H01B 7/0045* (2013.01); *H01B 7/292* (2013.01); *F01N 2560/025* (2013.01)

(58) Field of Classification Search
CPC ....... H01B 17/58; H01B 7/292; H01B 7/0045
(Continued)

(56) References Cited

U.S. PATENT DOCUMENTS

| 8,263,866 B2* | 9/2012 | Sellis | B60R 16/0222 174/74 R |
| 2006/0054763 A1* | 3/2006 | Fryberger, Jr. | F16L 57/04 248/314 |
| 2017/0033542 A1* | 2/2017 | Galamba | H01B 7/292 |

FOREIGN PATENT DOCUMENTS

WO 2008118889 A1 10/2008

OTHER PUBLICATIONS

International Search Report, dated Oct. 21, 2016 (PCT/US2016/045462).

* cited by examiner

*Primary Examiner* — Timothy Thompson
*Assistant Examiner* — Charles Pizzuto
(74) *Attorney, Agent, or Firm* — Robert L. Stearns; Dickinson Wright, PLLC

(57) ABSTRACT

A thermal sleeve and method for protecting a temperature sensitive electronic member against exposure to heat. The thermal sleeve includes a tubular wall with an inner surface bounding an inner cavity extending along a central longitudinal axis between open opposite ends and a reflective outer surface. The thermal sleeve includes a positioning member constructed of a separate piece of material from the tubular wall, with an annular portion attached to the tubular wall and at least one resilient finger extending radially inwardly from the annular portion. The at least one finger extends radially inwardly along a plane from the fixed end along an arcuate path to a free end configured for abutment with a wiring harness attached to the temperature sensitive electronic member. The free end of the finger is radially expandable along the plane toward the annular portion to automatically adjust to an outer envelop of said wiring harness.

24 Claims, 4 Drawing Sheets

(51) Int. Cl.
*H01B 7/29* (2006.01)
*B60R 16/02* (2006.01)

(58) Field of Classification Search
USPC ...................................................... 174/119 R
See application file for complete search history.

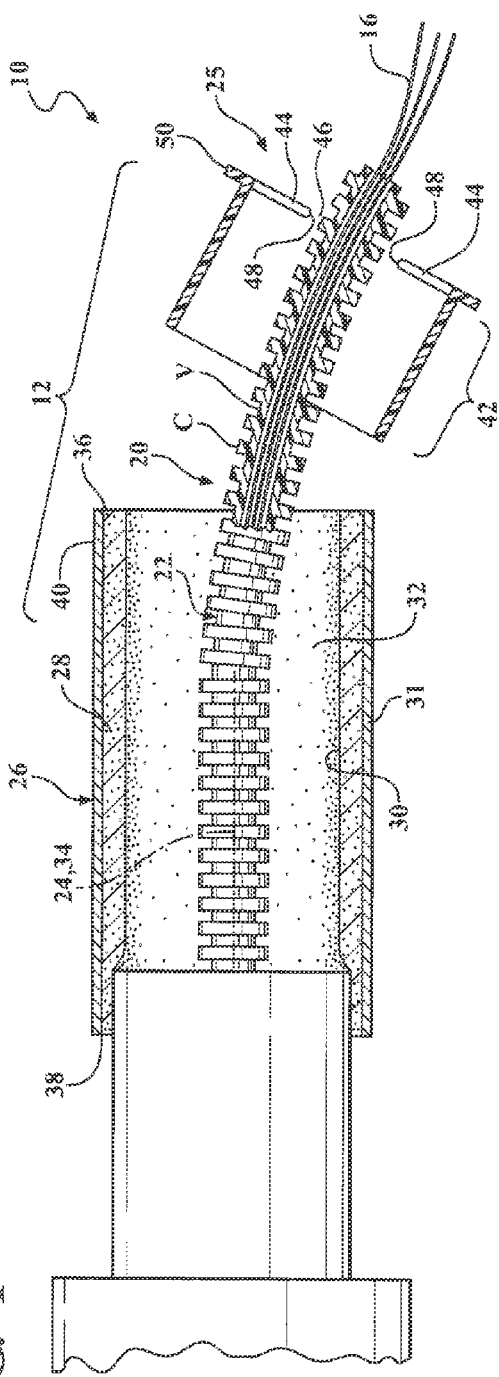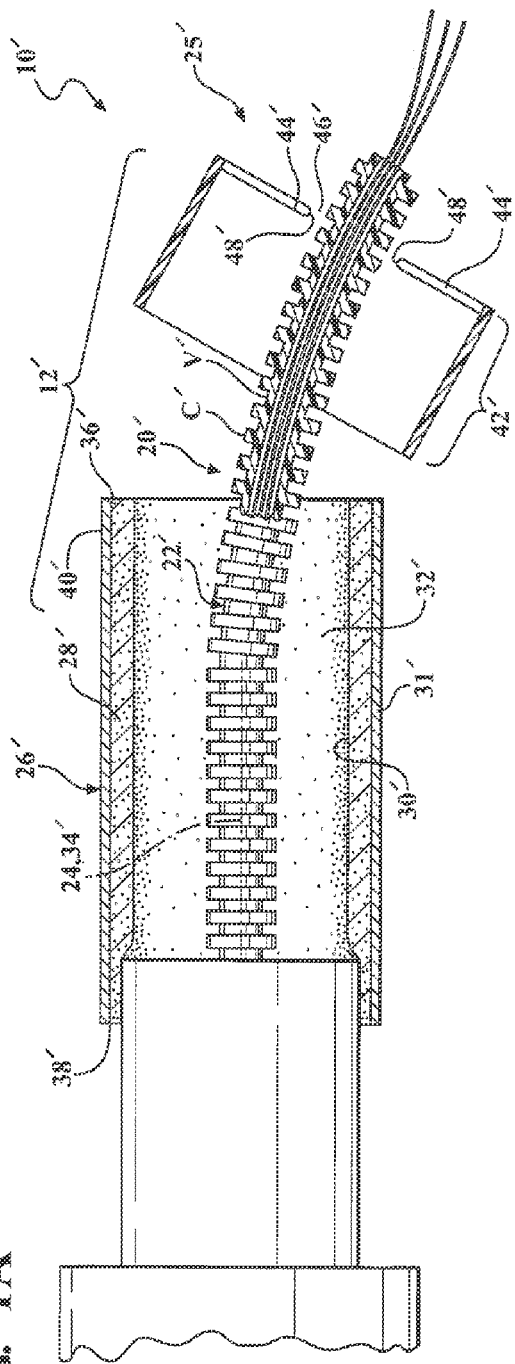

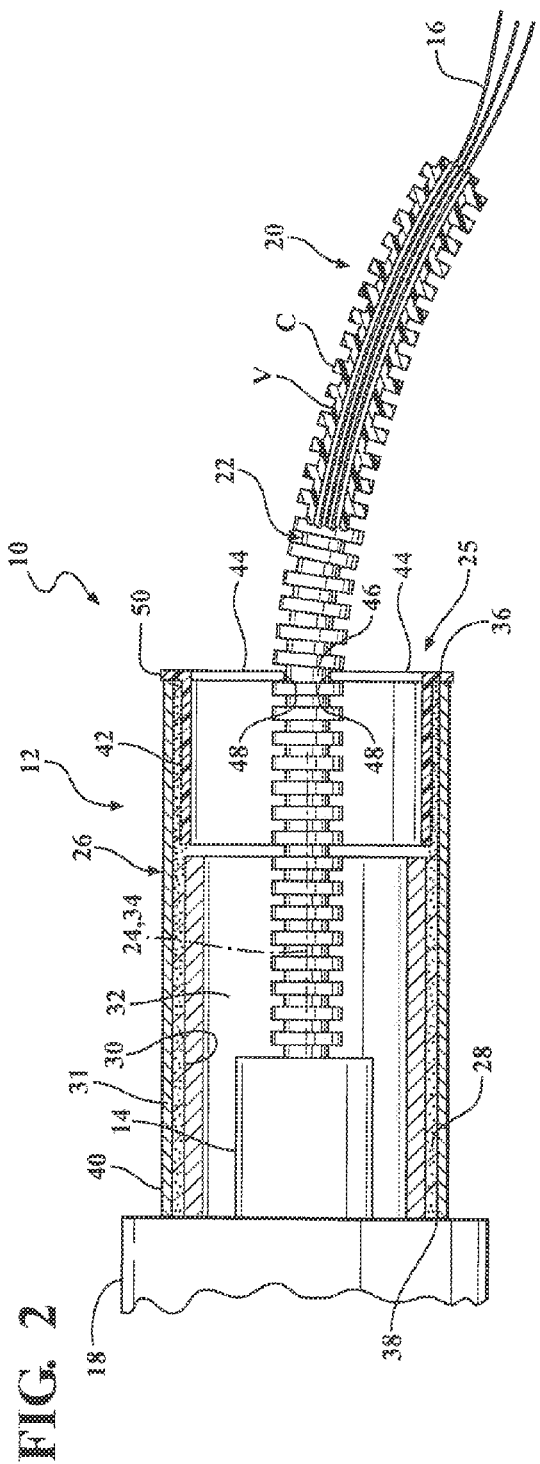
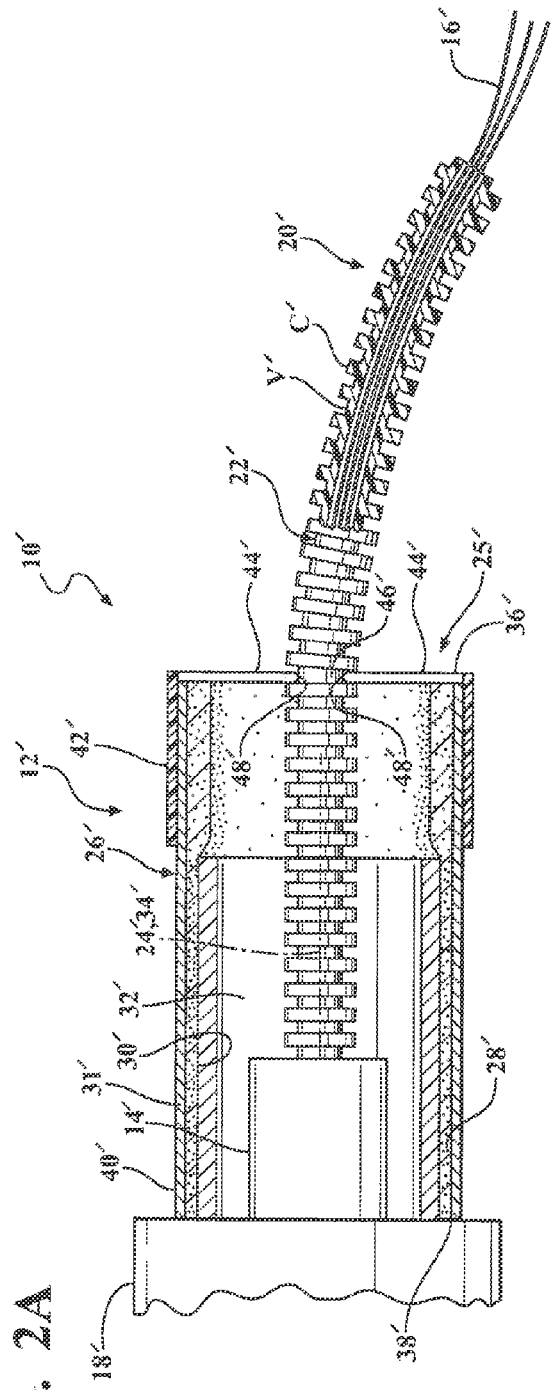
FIG. 2
FIG. 2A

THERMAL SLEEVE WITH SELF-ADJUSTING POSITIONING MEMBER, ASSEMBLY THEREWITH AND METHOD PROTECTING A TEMPERATURE SENSITIVE MEMBER THEREWITH

CROSS-REFERENCE TO RELATED APPLICATION

This application claims the benefit of U.S. Provisional Application Ser. No. 62/200,763, filed Aug. 4, 2015, which is incorporated herein by reference in its entirety.

BACKGROUND OF THE INVENTION

1. Technical Field

This invention relates generally to tubular sleeve assemblies that provide thermal protection to an electronic object contained therein, and more particularly to a tubular sleeve assembly including a positioning member to maintain the assembly in a selectively releasable, fixed position about the electronic object contained therein.

2. Related Art

Sensors used in automotive applications, such as oxygen sensors which provide data to control engine operation and performance, are often mounted within the engine compartment of a vehicle where they are subject to harsh environmental elements including intense radiant heat, sources of abrasion and vibration during vehicle operation. Due to the harsh environmental elements, it is advantageous, and in many cases a requirement, to cover the relatively delicate, temperature sensitive sensors with protective sleeving in an effort to dampen vibration, provide protection against abrasion and shield radiant heat from reaching the sensor. Such sleeves generally comprise an elongated, cylindrical tube extending between opposite, open free ends. The cylindrical tube includes a damping inner layer of a nonwoven material, for example, polyester felt and a reflective outer layer comprising, for example, an aluminum foil layer laminated to an outer surface of the inner layer.

Due to the configuration of the aforementioned protective cylindrical sleeve and its harsh environment, it is typically difficult to assemble the sleeve about the sensor and elongate wire harness connected thereto in a manner which allows the sleeve to be reliably secured and maintained in a desired position, while at the same time being readily removable for servicing of the sensor. Adhesives, tape and interference fits of an entirety of an inner surface of the cylindrical wall of the sleeve are used to effect attachment to the wire harness and to the sensor, but each of these mechanisms suffer various disadvantages. Adhesive attachment of the sleeve about the sensor, while generally secure, at least initially, permanently attaches the sleeve to the sensor, and thus, complicates servicing the sensor at a future time, and in addition, the adhesives can breakdown over time, thereby causing the sleeve to become dislodged from its desired protective position about the sensor. As a result, while in its initially bonded position, this method does not allow for easy removal of the sleeve for servicing of the sensor or reuse of the sleeve, as it requires destroying the bond joint of the adhesive. In addition, tape and interference fits can be unreliable in view of the heat and vibration encountered within the engine compartment, with tapes further being particularly burdensome to apply. Further, friction fits of an entirety of a sleeve inner surface suffer from variances in component tolerances, and difficulty of assembly, particularly if the interference is too great, or if the sleeve needs to traverse increased diameter obstacles along the path of assembly, such as a connector, for example. Further mechanisms are also known, such as using end caps made from separate materials from the tubular sleeve to position the sleeve about an elongate member of a fixed, predetermined diameter, wherein the end cap facilitates locating and maintaining the tubular sleeve in its intended position about the wire harness. Although generally effective in locating and maintaining the tubular sleeve in its assembled position, known end caps are typically suitable for use about wire harness having a specific diameter, and thus, they are not useable over a range of wire harness diameters, thereby requiring differently sized end caps for different applications.

SUMMARY OF THE INVENTION

In accordance with one aspect of the invention, a thermal sleeve for protecting an electronic member connected to a wiring harness against exposure to heat is provided. The thermal sleeve has a tubular member including a circumferentially continuous wall with an inner surface bounding an inner cavity extending along a central longitudinal axis between open opposite ends and a reflective outer surface. Further, the thermal sleeve includes a positioning member constructed of a separate piece of material from the tubular member. The positioning member has an annular portion attached to the tubular member and at least one resilient finger having a fixed end attached to the annular portion. The at least one finger extends radially inwardly along a plane from the fixed end along an arcuate path to a free end configured for abutment with the wiring harness. The free end of the finger is radially expandable along the plane toward the annular portion to adjust to an outer envelop of said wiring harness.

In accordance with another aspect of the invention, the at least one resilient finger can be provided as a single resilient finger that extends spirally about said central longitudinal axis.

In accordance with another aspect of the invention, the central longitudinal axis extends transversely to the plane along which the at least one finger extends.

In accordance with another aspect of the invention, the at least one resilient finger can be provided as a plurality of resilient fingers.

In accordance with another aspect of the invention, the plurality of resilient fingers can be arced shaped.

In accordance with another aspect of the invention, the plurality of resilient fingers can be circular arced shaped.

In accordance with another aspect of the invention, the plurality of resilient fingers can be noncircular arced shaped.

In accordance with another aspect of the invention, the plurality of resilient fingers can be elliptically arced shaped.

In accordance with another aspect of the invention, each of the plurality of fingers has a cord length extending between the fixed end and the free end, wherein the cord length decreases proportionately in direct response to the size of the outer envelop of the wiring harness.

In accordance with another aspect of the invention, the at least one resilient finger can be provided with a symmetrical outer periphery as viewed in lateral cross-section.

In accordance with another aspect of the invention, the at least one resilient finger can be provided with a circular outer periphery as viewed in lateral cross-section.

In accordance with another aspect of the invention, the at least one resilient finger can be provided with a polygonal shape having sides of substantially equal length as viewed in lateral cross-section.

In accordance with another aspect of the invention, a thermal sleeve in combination with a wiring harness configured in electrical communication with a sensor is provided. The thermal sleeve includes a tubular member having a circumferentially continuous wall with an inner surface bounding an inner cavity extending along a central longitudinal axis between open opposite ends and a reflective outer surface. A positioning member has an annular portion attached to the tubular member. The positioning member includes at least one resilient finger having a fixed end attached to the annular portion. The at least one finger extends radially inwardly along a plane from the fixed end along an arcuate path to a free end configured for abutment with the wiring harness. The at least one finger is compressible radially outwardly along the plane toward the annular portion to automatically adjust to an outer envelop of the wiring harness.

A method of protecting a temperature sensitive sensor attached to a wire harness against environmental thermal affects is provided. The method includes providing a tubular member having a circumferentially continuous wall with an insulative inner layer bounding an inner cavity extending along a central longitudinal axis between open opposite ends and a reflective outer layer. Further, providing a positioning member having an annular portion attached to the tubular member and at least one resilient, arcuate finger having a fixed end attached to the annular portion, with the at least one arcuate finger extending radially inwardly along a plane from the fixed end to a free end. Further yet, sliding the tubular member along the wire harness to at least partially surround the sensor and simultaneously bringing the at least one arcuate finger into abutment with the wiring harness and causing the at least one arcuate finger to compress radially outwardly along the plane toward the annular portion to grip the wiring harness and maintain the tubular member in shielding relation about the sensor.

In accordance with another aspect of the invention, the method can further include providing the positioning member with a plurality of arcuate fingers and causing the plurality of arcuate fingers to compress radially outwardly along the plane toward the annular portion to grip the wiring harness and maintain the tubular member in shielding relation about the sensor.

In accordance with another aspect of the invention, the method can further include providing the positioning member with a single arcuate finger and causing the single arcuate finger to compress radially outwardly along the plane toward the annular portion to grip the wiring harness and maintain the tubular member in shielding relation about the sensor.

In accordance with another aspect of the invention, the method can further include providing the at least one arcuate finger having a symmetrical outer periphery in lateral cross-section.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, in which:

FIG. 1 is an exploded cross-sectional side view of a thermal sleeve assembly constructed in accordance with one aspect of the invention for protecting an electrical component shown disposed about a wire harness connected to the electrical component;

FIG. 1A is a view similar to FIG. 1 of a thermal sleeve assembly constructed in accordance with one aspect of the invention FIG. 2 is an assembled cross-sectional side view of the thermal sleeve assembly of FIG. 1;

FIG. 2A is an assembled cross-sectional side view of the thermal sleeve assembly of FIG. 1A;

DETAILED DESCRIPTION OF PREFERRED EMBODIMENTS

Figure 3:
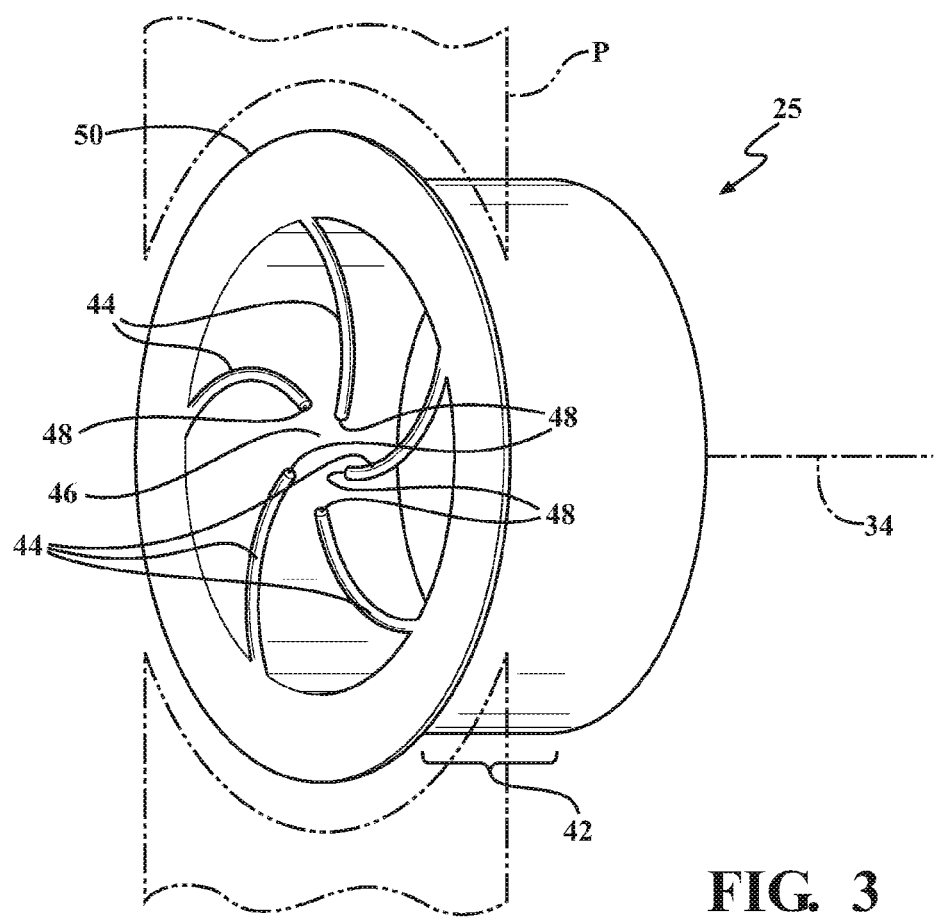
FIG. 3 is an isometric view of a positioning member in accordance with one aspect of the invention of the thermal sleeve assembly of FIG. 1.

Referring in more detail to the drawings, FIGS. 1 and 2 show an assembly 10, including a thermal sleeve with a self-adjusting positioning member, referred to hereafter simply as sleeve assembly or simply sleeve 12, constructed in accordance with one aspect of the invention, for protecting a temperature sensitive member, such as an electrical member 14 contained, at least in part, therein, such as sensor, against the effects of extreme radiant heat, abrasion, contamination and vibration, wherein the sensor 14 is shown connected to an end of a wire harness 16 and to an engine component 18 of a vehicle (FIG. 2). The wire harness 16 can be provided as a bundle of exposed, insulated wires or as a bundle of insulated wires enclosed within an outer protective sleeve, also referred to as tube 20, such as a tube having a generally smooth or corrugated outer surface 22, by way of example and without limitation. The sleeve 12 is configured for slidable movement along a longitudinal axis 24 of the wire harness 16 and tube 20 thereof, if provided, to allow the sleeve 12 to be brought into its desired protective position about the sensor 14. The sleeve 12 is configured, via a fixedly attached self-adjusting positioning member 25, as discussed in further detail below, to remain fixed in its protective position until desired to selectively slide the sleeve 12 away from its protective position, such as may be desired to service the sensor 14. The sleeve 12 remains in its protective position during use, without need of secondary fasteners, such as tape or adhesives, and thus, assembly 10 is made simple, aesthetically pleasing, and economical in manufacture and use.

The sleeve 12 can be constructed having any desired length. The sleeve 12 has a tubular member 26 including a circumferentially continuous inner layer of material forming an inner wall 28 with an inner surface 30 and an outer surface 31, with the inner surface 30 bounding an inner cavity 32 and extending along a central longitudinal axis 34 between open opposite ends 36, 38. The tubular member 26 further includes a reflective outer layer of material forming a reflective outer surface 40, wherein the outer layer of reflective material is fixed to the outer surface 31 of the inner wall 28. The inner wall 28, in accordance with one aspect of the invention, can be constructed of any suitable insulating nonwoven, woven, knit, or braided material, and can be constructed having any desired wall thicknesses, depending on the nature and severity of heat exposure in the intended environment.

The reflective outer surface 40 is provided to reflect extreme radiant heat typical of an engine compartment, including temperatures generated by an exhaust system. The outer layer 40 can be formed of any suitable metal material, including a foil layer of aluminum or other desired foil metals. The foil outer layer 40 is relatively thin, thereby allowing the sleeve 12 to remain flexible over meandering paths and corners. The outer layer 40 can be spiral wrapped or cigarette wrapped about the inner wall 28, as desired. Any suitable, heat resistant adhesive can be used to facilitate bonding the outer layer 40 to the outer surface 31 of the inner wall 28, if desired.

The self-adjusting positioning member of the sleeve 12, referred hereafter simply as positioning member 25, as best shown in FIG. 3, in accordance with one aspect of the invention, by way of example and without limitation, is constructed of a separate piece of resilient material from the tubular member 26, such as from a resilient plastic or of a resilient, springy metal material. The positioning member 25 has a body, shown, by way of example and without limitation, as including an annular wall or portion, such as a generally cylindrical, tubular portion 42, and at least one flexible, resilient finger, and shown as a plurality of fingers 44, extending radially inwardly from the annular portion 42 for retaining abutment with the wiring harness 16, or the tube 20 thereof, if provided. The tubular portion 42 is shown as being sized for close, relatively snug receipt inside the inner wall 28 of the open end 36 of the tubular member 26. It is contemplated herein that the tubular portion 42 could be sized for close, snug receipt about an outer surface, as shown in FIG. 2A, if desired. Any suitable fastening mechanism, including mechanical fasteners, such as staples, or an adhesive, such as a high temperature resistant adhesive, can be used to fix the positioning member 25 to the tubular member 26.

The finger or fingers 44 of the positioning member 25 are formed to extend radially inwardly from the tubular portion 42 for close, abutting contact about the wire harness 16, and tube 20, if provided. The fingers 44 are flexibly resilient, such that the fingers allow the wire harness 16 and tube 20 to pass freely through an opening 46 formed by an inner periphery of free ends 48 of the fingers 44, whereupon the resiliency of the fingers 44 causes the fingers 44 to remain in abutment with the wire harness or tube 20 thereof. By remaining in abutment with the wire harness 16 or tube 20, the positioning member 25, and thus, the sleeve 12 remains fixed in the desired assembled position relative to the wiring harness 16 and tube 20 thereof until some selected time when it may be desired to slideably remove the sleeve 12 from its assembled position.

Figure 3A:
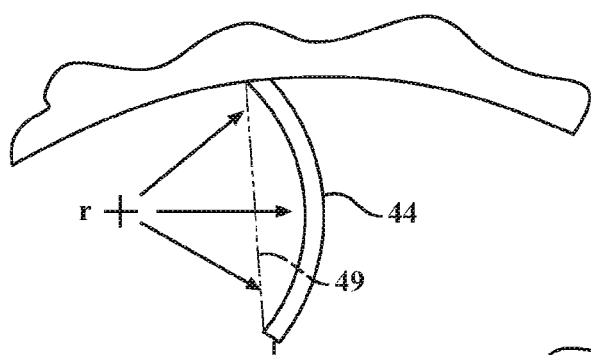
FIG. 3A is partial plan view of a finger of a positioning member in accordance with one aspect of the invention.
Figure 3B:
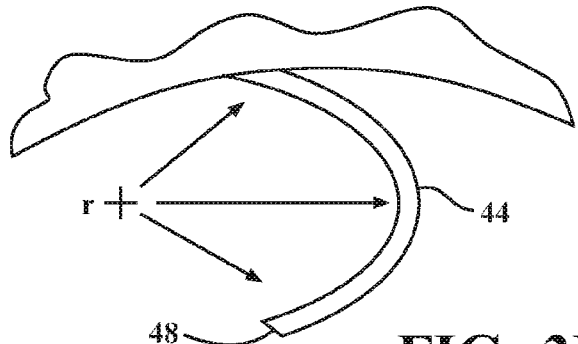
FIG. 3B is partial plan view of a finger of a positioning member in accordance with another aspect of the invention.
Figure 5A:
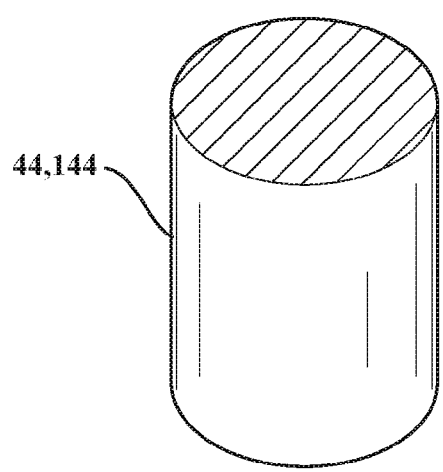
FIG. 5A is an isometric, cross-sectional view of a finger of a positioning member in accordance with another aspect of the invention.
Figure 5B:
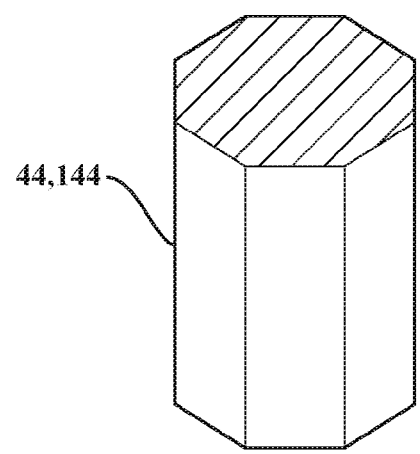
FIG. 5B is an isometric, cross-sectional view of a finger of a positioning member in accordance with yet another aspect of the invention.

The finger or fingers 44 have an arcuate body extending generally along a plane P, wherein the plane P is shown as extending generally transversely to the central longitudinal axis 34. The fingers 44 extend from the annular wall or portion 42 to their innermost free ends 48. As a result of their arcuate shape, the fingers 44 are radially expandable along the plane P to automatically adjust to the configuration of an outer surface of the elongate wiring harness 16, and tube 20 thereof. The plurality of fingers 44 are shown as having generally sickle-shaped bodies, shown in FIG. 3A as having a constant or substantially constant circular arced shaped radius of curvature r, and in an alternate embodiment shown in FIG. 3B as having a varying radius r, such as that of an ellipse. Each of the fingers 44 have a cord 49 extending between the fixed end (end fixed to the body of the position member 25) and the radially inwardly extended free end 48, wherein the cord 49 decreases in length as the fingers 44 are compressed radially outwardly, such as during installation or removal. In addition, the bodies of the fingers 44 have a generally symmetrical outer periphery, as viewed in lateral cross-section, such as round (FIG. 5A), square, or any other polygonal shape (FIG. 5B) having generally equal length sides, by way of example and without limitation. The fingers 44 have a relatively high length-to-maximum diameter ratio, and thus, the fingers 44 are flexible and bendable in a purely radial direction, which is further facilitated by their generally sickle shape, thus, lending to their ability to automatically adjust to the size of the wiring harness disposed therethrough. To facilitate assembly, the fingers 44 can be wound or generally wound in the direction of their arcuate shape, thereby causing them to take on an increased, bent arcuate shape up until the winding or compressing force is released to allow the free end(s) 48 to engage the tube 20.

The positioning member 25 is further shown in FIGS. 1-3 as having an annular rim 50 extending radially outwardly from the tubular portion 42 adjacent the end an end of the tubular portion 42. The rim 50 functions as a positive stop or shoulder while inserting the positioning member 25 into the end 36 of the tubular member 26, thereby assuring the positioning member 25 is properly seated and fixed to the tubular member 26. In contrast, as shown in FIGS. 1A and 2A, a positioning member 25' can be constructed without a rim, wherein the positioning member 25' can be disposed about an outer surface of the tubular member 26'. In FIGS. 1A and 2A, each of the features discussed above are identified by the same reference numerals as used in FIGS. 1 and 2, though given a prime symbol (') to represent a different embodiment. Other than the positioning member 25' being disposed about the tubular member 26', the configuration of the assembly 10' is generally the same as discussed for Figures land 2.

Figure 4:
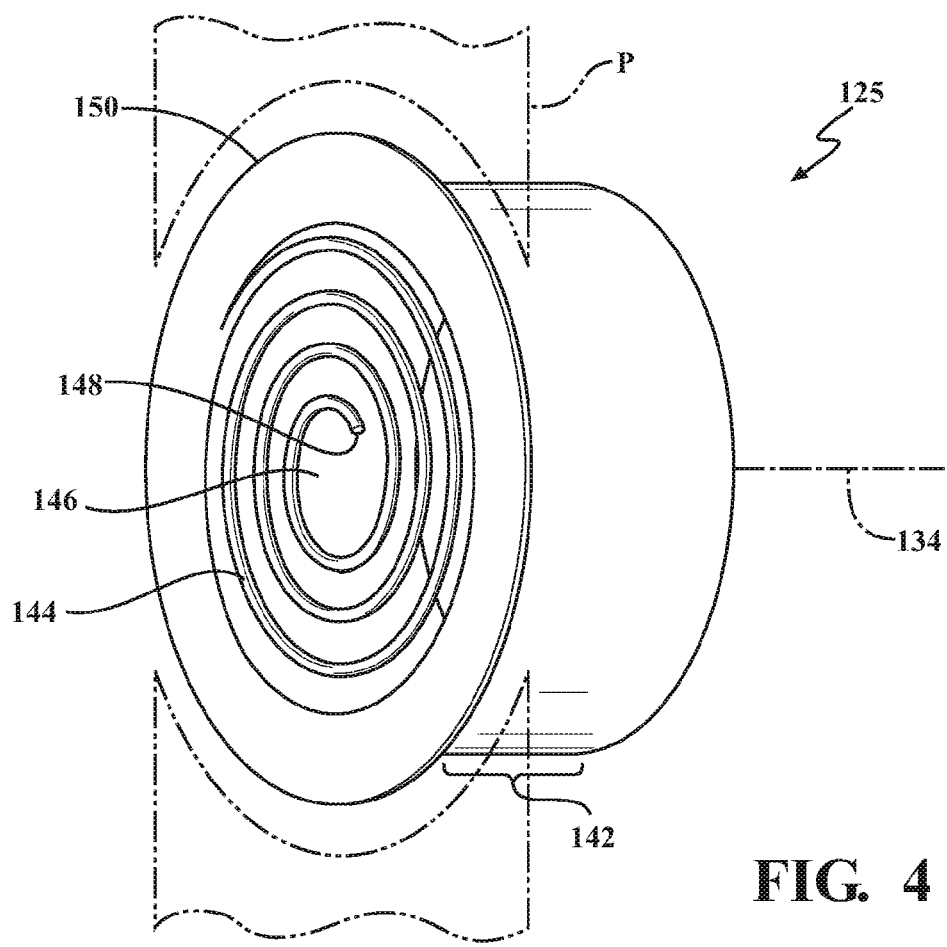
FIG. 4 is an isometric view of a positioning member of in accordance with another aspect of the invention of a thermal sleeve assembly similar to the assembly of FIG. 1.

In FIG. 4, a positioning member 125 constructed in accordance with another aspect of the invention is shown, wherein the same reference numerals, offset by a factor of 100, are used to identify like features discussed above. The positioning member 125 has an annular wall or portion 142 with a single finger 144 having a generally spiral-shaped configuration extending generally within a plane P. The plane P is shown as extending generally transversely to a longitudinal central axis 134 of the positioning member 125. In the embodiment shown, the finger 144 is wrapped at least one time, and shown as being between about 2-4 times about the axis 134. The finger 144 can be wound in a reverse direction to its direction of curl to cause the radially innermost region and end 148 of the finger 144 to expand radially outwardly, as described above with regard to FIGS. 1 and 1A, thereby allowing the wiring harness 16 and option tube 20 to be easily passed through an opening 146 bounded by the finger 144. Then, upon disposing the wiring harness 16, and optional tube 20, through the opening 146, the finger 144 can be released, thereby allowing the finger 144 to automatically uncoil to bring the radially innermost region and end 148 of the finger 144 into abutting contact with the wiring harness 16 or tube 20, if provided. Accordingly, the finger 144 effectively grasps the outer surface of the wiring harness 16 or tube 20 and maintains a sleeve, as discussed above with regard to the sleeve 12, in its protection position along the wiring harness 16 and optional tube 20 until it is desired to selectively remove the sleeve, such as during service. In FIG. 4, the positioning member 125 is shown having a construction similar to that of FIG. 3, namely, having a rim 150 extending radially outwardly from the tubular portion 142, though it is contemplated herein that the positioning member 125 could be constructed without a rim, as shown generally in FIGS. 1A and 2A.

If a tube 20 is provided as a corrugate tube, as discussed above, the finger(s) 44, 144 can be expanded radially outwardly by being bent or coiled radially outwardly to fit in clearance relation over annular crests C during installation and removal, as shown generally in FIGS. 1 and 1A, and can be constructed having a predetermined thickness to be at least partially received within annular valleys V of the corrugations to facilitate maintaining the sleeve 12 in its intended "in use" position about the sensor 14 upon releasing the finger(s) 44, 144, as shown generally in FIGS. 2 and 2A.

Obviously, in light of the above teachings, many modifications and variations of the present invention are possible. It is, therefore, to be understood that within the scope of the appended claims, the invention may be practiced otherwise than as specifically described.

What is claimed is:

1. A thermal sleeve for protecting an electronic member operably connected to an elongate wiring harness, comprising:
    a tubular member including a circumferentially continuous wall with an insulative inner layer bounding an inner cavity extending along a central longitudinal axis between open opposite ends and a reflective outer layer; and
    a positioning member having an annular portion attached to the tubular member and at least one resilient finger having a fixed end attached to the annular portion, said at least one finger extends radially inwardly along a plane from said fixed end along an arcuate path to a free end configured for abutment with the wiring harness, said at least one finger being compressible radially outwardly along said plane toward said annular portion to automatically adjust to an outer envelop of the wiring harness.

2. The thermal sleeve of claim 1, wherein said central longitudinal axis extends transversely to said plane.

3. The thermal sleeve of claim 1, wherein said at least one resilient finger is a single resilient finger that extends spirally about said central longitudinal axis.

4. The thermal sleeve of claim 3, wherein said central longitudinal axis extends transversely to said plane.

5. The thermal sleeve of claim 1, wherein said at least one resilient finger includes a plurality of resilient fingers.

6. The thermal sleeve of claim 5, wherein said resilient fingers are circular arced shaped.

7. The thermal sleeve of claim 5, wherein said resilient fingers are arced shaped, each of said fingers having a cord extending between said fixed end and said free end, said cord decreasing in length as said fingers are compressed radially outwardly.

8. The thermal sleeve of claim 1, wherein said at least one resilient finger has a symmetrical outer periphery in lateral cross-section.

9. The thermal sleeve of claim 8, wherein said outer periphery is substantially circular.

10. The thermal sleeve of claim 8, wherein said outer periphery is polygonal having sides of substantially equal length.

11. A thermal sleeve in combination with a wiring harness configured in electrical communication with a sensor, comprising:
    a tubular member including a circumferentially continuous wall with an insulative inner layer bounding an inner cavity extending along a central longitudinal axis between open opposite ends and a reflective outer layer; and
    a positioning member having an annular portion attached to the tubular member and at least one resilient finger having a fixed end attached to the annular portion, said at least one finger extending radially inwardly along a plane from said fixed end along an arcuate path to a free end configured for abutment with said wiring harness, said at least one finger being compressible radially outwardly along said plane toward said annular portion to automatically adjust to an outer envelop of said wiring harness.

12. The combination of claim 11, wherein said central longitudinal axis extends transversely to said plane.

13. The combination of claim 11, wherein said at least one resilient finger is a single resilient finger that extends spirally about said central longitudinal axis.

14. The combination of claim 13, wherein said central longitudinal axis extends transversely to said plane.

15. The combination of claim 11, wherein said at least one resilient finger includes a plurality of resilient fingers.

16. The combination of claim 15, wherein said resilient fingers are circular arced shaped.

17. The combination of claim 15, wherein said resilient fingers are arced shaped, each of said fingers having a cord extending between said fixed end and said free end, said cord decreasing in length as said fingers are compressed radially outwardly.

18. The combination of claim 11, wherein said at least one resilient finger has a symmetrical outer periphery in lateral cross-section.

19. The combination of claim 18, wherein said outer periphery is substantially circular.

20. The combination of claim 18, wherein said outer periphery is polygonal having sides of substantially equal length.

21. A method of protecting a temperature sensitive member attached to a wire harness against environmental thermal affects, comprising:
    providing a tubular member including a circumferentially continuous wall with an insulative inner layer bounding an inner cavity extending along a central longitudinal axis between open opposite ends and a reflective outer layer, and further including a positioning member having an annular portion attached to the tubular member and at least one resilient, arcuate finger having a fixed end attached to the annular portion, the at least one arcuate finger extending radially inwardly along a plane from the fixed end to a free end; and
    sliding the tubular member along the wire harness to at least partially surround the temperature sensitive member and simultaneously bringing the at least one arcuate finger into abutment with the wiring harness and causing the at least one arcuate finger to compress radially outwardly along the plane toward the annular portion to grip the wiring harness and maintain the tubular member in shielding relation about the temperature sensitive member.

22. The method of claim 21, further including providing the positioning member with a plurality of arcuate fingers and causing the plurality of fingers to compress radially outwardly along the plane toward the annular portion to grip the wiring harness and maintain the tubular member in shielding relation about the temperature sensitive member.

23. The method of claim 21, further including providing the positioning member with a single arcuate finger and causing the single arcuate finger to compress radially outwardly along the plane toward the annular portion to grip the wiring harness and maintain the tubular member in shielding relation about the temperature sensitive member.

24. The method of claim 21 further including providing the at least one arcuate finger having a symmetrical outer periphery in lateral cross-section.

* * * * *